United States Patent
Kim et al.

(10) Patent No.: US 10,481,716 B2
(45) Date of Patent: Nov. 19, 2019

(54) TOUCH DISPLAY APPARATUS, DISPLAY PANEL, AND ALL-IN-ONE SWITCH DEVICE

(71) Applicant: LG DISPLAY CO., LTD., Seoul (KR)

(72) Inventors: CheolSe Kim, Daegu (KR); Jinseong Kim, Gyeonggi-do (KR); JiYeon Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 91 days.

(21) Appl. No.: 15/812,304

(22) Filed: Nov. 14, 2017

(65) Prior Publication Data

US 2018/0150165 A1 May 31, 2018

(30) Foreign Application Priority Data

Nov. 30, 2016 (KR) ........................ 10-2016-0161237

(51) Int. Cl.
```
G06F 3/041      (2006.01)
G06K 9/00       (2006.01)
G06F 3/042      (2006.01)
G09G 3/20       (2006.01)
```

(52) U.S. Cl.
CPC ............ G06F 3/0412 (2013.01); G06F 3/042 (2013.01); G06F 3/0416 (2013.01); G06K 9/0004 (2013.01); G06K 9/0008 (2013.01); *G06F 2203/04109* (2013.01); *G09G 3/2092* (2013.01); *G09G 2300/08* (2013.01)

(58) Field of Classification Search
USPC ........................................................ 345/175
See application file for complete search history.

(56) References Cited

U.S. PATENT DOCUMENTS

| | | | |
|---|---|---|---|
| 2002/0003231 A1* | 1/2002 | Sun ............................. | B41J 2/45 257/59 |
| 2004/0227743 A1* | 11/2004 | Brown ................ | G02F 1/13338 345/204 |
| 2008/0121442 A1* | 5/2008 | Boer ...................... | G06F 3/0412 178/18.09 |
| 2008/0198143 A1* | 8/2008 | Kinoshita ............. | G06F 3/0412 345/175 |

(Continued)

OTHER PUBLICATIONS

Combined Search and Examination Report dated May 25, 2018, issued in United Kingdom Patent Application No. GB1719986.0.

*Primary Examiner* — Chineyere D Wills-Burns
(74) *Attorney, Agent, or Firm* — Morgan, Lewis & Bockius LLP

(57) ABSTRACT

The present embodiments relate to an all-in-one switch device as well as a touch display apparatus and a display panel including such an all-in-one switch device. The all-in-one switch device includes a switching transistor electrically connected between a pixel electrode and a data line, and a sensor pattern connected between a first electrode and a second electrode of the switching transistor. One device is enough to provide both a switching function for display driving and a sensor function for sensing a touch position and/or a fingerprint, a separate touch sensor having a large size is unnecessary, and it is possible to precisely sense a touch position and/or a fingerprint without being affected by parasitic capacitance, even in a situation where a system has a structure or a circuit in which touch sensing based on capacitance is impossible.

23 Claims, 23 Drawing Sheets

(56) References Cited

U.S. PATENT DOCUMENTS

| | | | |
|---|---|---|---|
| 2009/0280606 A1* | 11/2009 | Shih | H01L 27/14692 438/155 |
| 2009/0289920 A1* | 11/2009 | Chiang | G06F 3/0412 345/175 |
| 2010/0026636 A1 | 2/2010 | Jang et al. | |
| 2011/0168998 A1* | 7/2011 | Liang | H01L 29/42384 257/57 |
| 2012/0182277 A1 | 7/2012 | Jeong et al. | |
| 2012/0287080 A1* | 11/2012 | Akimoto | G02B 26/023 345/174 |
| 2013/0100080 A1* | 4/2013 | Cheng | G06F 3/0412 345/175 |
| 2013/0201085 A1* | 8/2013 | Chang | G09G 3/3258 345/76 |
| 2014/0320446 A1* | 10/2014 | Kim | G06F 3/044 345/174 |
| 2015/0070684 A1* | 3/2015 | Min | G01C 3/08 356/5.01 |
| 2016/0132177 A1* | 5/2016 | Bae | G06K 9/00013 345/174 |
| 2016/0253010 A1 | 9/2016 | Xu | |
| 2016/0378239 A1* | 12/2016 | Lee | G09G 3/3648 345/173 |

\* cited by examiner

FPA

FPA

FPA

TOUCH DISPLAY APPARATUS, DISPLAY PANEL, AND ALL-IN-ONE SWITCH DEVICE

CROSS REFERENCE TO RELATED APPLICATION

This application claims priority from Korean Patent Application No. 10-2016-0161237, filed on Nov. 30, 2016, which is hereby incorporated by reference for all purposes as if fully set forth herein.

BACKGROUND

1. Technical Field

The present disclosure relates to a touch display apparatus, a display panel, and an all-in-one switch device.

2. Description of the Related Art

As the information society develops, display devices for displaying an image are being increasingly required in various forms, and in recent years, various display devices such as Liquid Crystal Displays (LCDs), Plasma Display Panels (PDPs), and Organic Light Emitting Display Devices (OLEDs) have been utilized.

Such display devices include a touch display device which can provide a touch based input method enabling a user to easily, instinctively, and conveniently input information or instructions, beyond a conventional input method, such as a button, a keyboard, or a mouse.

In order to provide a touch based input method, the touch display device should be able to determine whether a user inputs a touch, and precisely detect touch coordinates (a touch position).

Meanwhile, in these days, a touch display device may use a fingerprint, like biometric information, as a user authentication means for online banking, product purchasing, application purchasing and downloading, etc.

For various application functions, the touch display device detects a user's fingerprint and compares the detected fingerprint with a previously stored fingerprint to provide user authentication.

As described above, in order to precisely perform various application functions, a touch display device is firstly required to precisely sense a touch position or a fingerprint.

However, a conventional touch display device mainly uses a method of applying a predetermined driving voltage to an electrode corresponding to a touch sensor so as to sense a touch, and sensing a touch position or a fingerprint on the basis of capacitance which occurs between the touch sensor and the finger or another electrode.

When a touch position or a fingerprint is sensed on the basis of capacitance as described above, unnecessary parasitic capacitance degrades accuracy in touch sensing.

Besides, when a touch position or a fingerprint is sensed in a predetermined area, capacitance-based sensing may be impossible for reasons relating to the structure or the circuit.

In addition, in a conventional touch sensing technology, a plurality of touch sensors should be formed in a touch screen panel or a display panel having the touch screen panel embedded therein. Therefore, the conventional touch sensing technology results in a complex and difficult panel manufacturing process and a thick panel.

SUMMARY

Accordingly, embodiments of the present disclosure are directed to a touch display apparatus, a display panel, and an all-in-one switch device that substantially obviate one or more of the problems due to limitations and disadvantages of the related art.

An aspect of the present disclosure is to provide an all-in-one switch device, and a touch display apparatus and a display panel including the same, wherein the all-in-one switch device can perform a switching function for display driving and a sensor function for sensing a touch position and/or a fingerprint.

Another aspect of the present disclosure is to provide a touch display apparatus, a display panel, and an all-in-one switch device, which can precisely sense a touch position and/or a fingerprint without having a separate touch sensor having a big size.

Yet another aspect of the present disclosure is to provide a touch display apparatus, a display panel, and an all-in-one switch device, which can precisely sense a touch position and/or a fingerprint without being affected by parasitic capacitance.

Yet another aspect of the present disclosure is to provide a touch display apparatus, a display panel, and an all-in-one switch device, which can precisely sense a touch position and/or a fingerprint even in a situation where a system has a structure or a circuit in which touch sensing based on capacitance is impossible.

Yet another aspect of the present disclosure is to provide a touch display apparatus, a display panel, and an all-in-one switch device, which can precisely sense a touch position and/or a fingerprint through an optical method.

Yet another aspect of the present disclosure is to provide a touch display apparatus, a display panel, and an all-in-one switch device, which can precisely sense a touch position and/or a fingerprint while exhibiting good mobility and fast response speed and having a thin bezel, a high resolution, a high aperture ratio, and a low power consumption.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display apparatus comprises: a display panel having a data line and a gate line arranged therein and a pixel electrode disposed in a pixel area defined by the data line and the gate line, wherein the pixel area includes a switching transistor and a sensor pattern arranged therein, the switching transistor has a first electrode electrically connected to the pixel electrode, a second electrode electrically connected to the data line, a third electrode electrically connected to the gate line, and a semiconductor layer, both ends of which are in contact with the first electrode and the second electrode, respectively, and both ends of the sensor pattern are in direct or indirect contact with the first electrode and the second electrode, respectively.

In another aspect, a display panel comprises a pixel electrode, a switching transistor electrically connected between the pixel electrode and a data line, and a sensor pattern connected between a first electrode and a second electrode of the switching transistor.

In another aspect, a display panel comprises a data line and a gate line arranged therein and a pixel defined by the data line and the gate line, wherein a pixel area includes: a pixel electrode, a switching transistor, and a sensor pattern arranged therein; the switching transistor has a first electrode electrically connected to the pixel electrode, a second electrode electrically connected to the data line, a third electrode electrically connected to the gate line, and a semiconductor layer, both ends of which are in contact with the first electrode and the second electrode, respectively; and the sensor pattern has a first end in contact with the first electrode and a second end in contact with the second electrode.

In another aspect, an all-in-one switch device comprises a first electrode electrically connected to a pixel electrode, a second electrode electrically connected to a data line, a third electrode electrically connected to a gate line, a semiconductor layer having a first end in contact with a first end of the first electrode and a second end in contact with a first end of the second electrode, and a sensor pattern having a first end in contact with a second end of the first electrode and a second end in contact with a second end of the second electrode.

As described above, the present embodiments may provide an all-in-one switch device, and a touch display apparatus and a display panel including the same, wherein the all-in-one switch device can perform a switching function for display driving and a sensor function for sensing a touch position and/or a fingerprint.

The present embodiments may provide a touch display apparatus, a display panel, and an all-in-one switch device, which can precisely sense a touch position and/or a fingerprint without having a separate touch sensor having a big size.

The present embodiments may provide a touch display apparatus, a display panel, and an integrated switch device, which can precisely sense a touch position and/or a fingerprint without being affected by parasitic capacitance.

The present embodiments may provide a touch display apparatus, a display panel, and an all-in-one switch device, which can precisely sense a touch position and/or a fingerprint even in a situation where a system has a structure or a circuit in which touch sensing based on capacitance is impossible.

The present embodiments may provide a touch display apparatus, a display panel, and an all-in-one switch device, which can precisely sense a touch position and/or a fingerprint through an optical method.

The present embodiments may provide a touch display apparatus, a display panel, and an all-in-one switch device, which can precisely sense a touch position and/or a fingerprint while exhibiting good mobility and fast response speed and having a thin bezel, a high resolution, a high aperture ratio, and a low power consumption.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
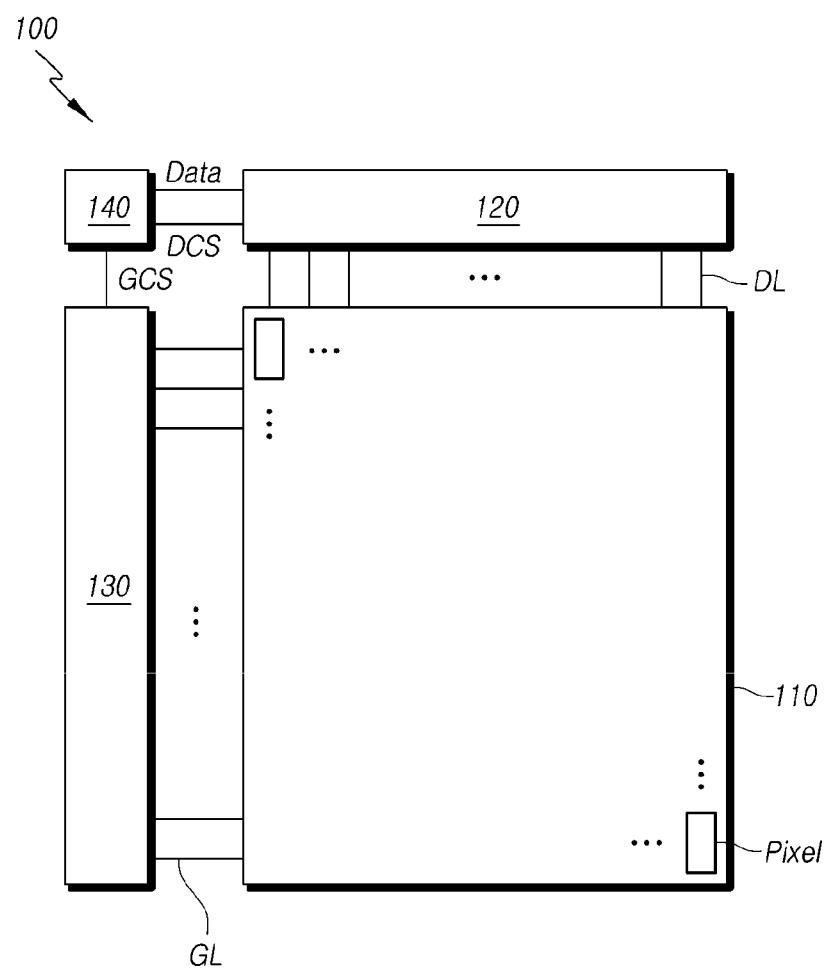
FIG. 1 is a diagram briefly illustrating a system configuration of a touch display apparatus according to the present embodiments.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order, sequence or the number of a corresponding component but used merely to distinguish the corresponding component from other component(s). In the case that it is described that a certain structural element "is connected to", "is coupled to", or "is in contact with" another structural element, it should be interpreted that another structural element may "be interposed between" respective certain structural elements or the respective certain structural elements may "be connected", "be coupled", or "be in contact" through another structural element as well as that the certain structural element is directly connected to or is in direct contact with another structural element.

Figure 2:
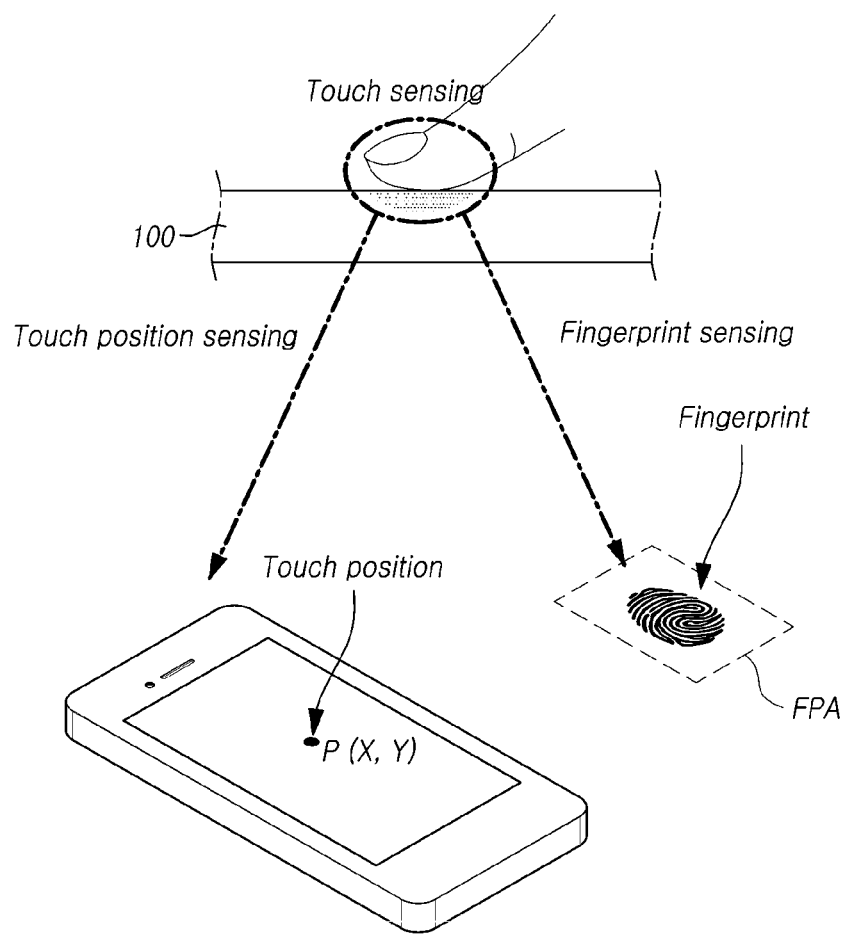
FIG. 2 is a diagram illustrating two types of touch sensing of a touch display apparatus according to the present embodiments.

FIG. 1 is a diagram briefly illustrating a system configuration of a touch display apparatus 100 according to the present embodiments, and FIG. 2 is a diagram illustrating two types of touch sensing of a touch display apparatus 100 according to the present embodiments.

Referring to FIG. 1, a touch display apparatus 100 according to the present embodiments may provide an image display function and a touch input function.

The touch display apparatus 100 according to the present embodiments may include a display panel 110, and a data driver circuit 120, a gate driver circuit 130, a controller 140, in order to provide the image display function.

A plurality of data lines DL and a plurality of gate lines GL are arranged in the display panel 110.

Also, a plurality of pixels defined by the data lines DL and the plurality of gate lines GL are arranged in the display panel 110.

In each pixel area PA, a pixel electrode to which a data voltage corresponding to an image signal of a corresponding pixel is applied, and a switching transistor that controls applying of the data voltage to the pixel electrode may be arranged.

The data driver circuit 120 is a circuit that drives a plurality of data lines DL in order to display an image, and may output a data voltage corresponding to an image signal to the plurality of data lines DL.

The gate driver circuit 130 is a circuit that sequentially drives a plurality of gate lines GL in order to display an image, and may sequentially output a gate signal (scan signal) to the plurality of gate lines GL in order to display an image.

The controller 140 corresponds to a configuration that controls the data driver circuit 120 and the gate driver circuit 130, and provides a various type of control signals (DCS, GCS, etc.) to the data driver circuit 120 and the gate driver circuit 130.

The controller 140 starts a scan according to a timing implemented in each frame, switches input image data received from the outside according to a data signal format used in the data driver circuit 120, outputs the switched image data, and controls data driving according to a proper time based on the scan.

The controller 140 may be a timing controller used in a general display technology or a control device that includes the timing controller and further performs another control function.

Although the data driver circuit 120 is located on only one side (for example, the upper or lower side) of the display panel 110 in FIG. 1, the data driver circuit 120 may be located on both sides (for example, the upper and lower side) of the display panel 110 according to a driving scheme, a panel design scheme, or the like.

The data driver circuit 120 may be implemented by including at least one Source Driver Integrated Circuit (SDIC).

Each SDIC may be connected to a bonding pad of the display panel 110 by a Tape Automated Bonding (TAB) method or a Chip On Glass (COG) method, may be directly disposed on the display panel 110, or may be integrated and be disposed on the display panel 110, in some cases. Further, each SDIC may be implemented in a Chip On Film (COF) method in which the SDIC is mounted on a film connected to the display panel 110.

Each SDIC may include a shift register, a latch circuit, a Digital to Analog Converter (DAC), an output buffer, and the like.

Each SDIC may further include an Analog to Digital Converter (ADC) according to circumstances.

Although the gate driver circuit 130 is located at only one side (for example, left side or right side) of the display panel 110 in FIG. 1, the gate driver circuit 130 may be located at both sides (for example, left side and right side) of the display panel 110 according to a driving scheme, a panel design scheme, or the like.

The gate driver circuit 130 may include at least one Gate Driver Integrated Circuit (GDIC).

Each GDIC may be connected to a bonding pad of the display panel 110 by a Tape Automated Bonding (TAB) method or a Chip On Glass (COG) method, may be implemented in a Gate In Panel (GIP) type to be directly disposed on the display panel 110, or may be integrated and be disposed on the display panel 110, in some cases. Further, each GDIC may be implemented in a Chip On Film (COF) method in which the GDIC is mounted on a film connected to the display panel 110.

Each GDIC may include a shift register, a level shifter, and the like.

Each pixel disposed in the display panel 110 may include a circuit element, such as a transistor.

A type and number of circuit elements included in each subpixel (SP) may be variously determined according to a provided function and a design type.

Meanwhile, the touch display apparatus 100 according to the present embodiments may provide a touch sensing function for sensing a user's touch in order to provide the touch input function.

A touch object, which is means for user's touch, may be a finger, a pen, etc., for example. For convenience of explanation, the touch object is assumed to be a finger in the following description.

In the present embodiments, the touch sensing function includes a touch position sensing function for sensing whether a user inputs a touch and/or sensing a touch position (that is, touch coordinates P(X, Y)) and a fingerprint sensing function (fingerprint recognition function) for sensing a user's fingerprint.

In the touch display apparatus 100 according to the present embodiments, a touch position sensor for sensing a touch position may be embedded in the display panel 110.

That is, in the touch display apparatus 100 according to the present embodiments, a touch screen panel may be an embedded type panel (for example, an in-cell type, an on-cell type, etc.), which is built in the display panel 110.

In the touch display apparatus 100 according to the present embodiments, a fingerprint sensor that senses a fingerprint may be also embedded in the display panel 110.

The fingerprint sensor may correspond to all or a part of multiple touch position sensors embedded in the display panel 110.

Meanwhile, the fingerprint sensor may correspond to a sensor separate from multiple touch position sensors embedded in the display panel 110.

As described above, a fingerprint sensor may be all or a part of multiple touch position sensors, or may be a sensor separate from multiple touch position sensors. However, the fingerprint sensor and the touch position sensor may have the same structure and may operate in the same way.

That is, the touch display apparatus 100 according to the present embodiments drives the fingerprint sensor and the touch position sensor in the same way to detect a signal.

There may be a difference between a process (algorithm) for finding a touch position and a process (algorithm) for finding a fingerprint (fingerprint information), on the basis of the detected signal.

The touch position sensor that senses a touch position may be disposed on the entire area of the display panel 110.

Figure 3A:
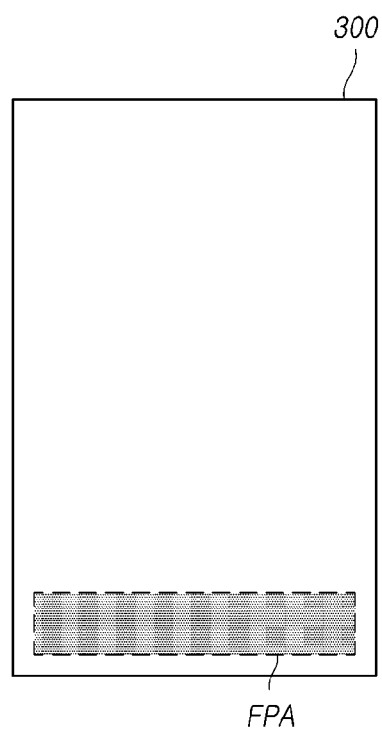
FIGS. 3A, 3B, and 3C are exemplary diagrams illustrating a fingerprint sensing area of a touch display apparatus according to the present embodiments.
Figure 3B:
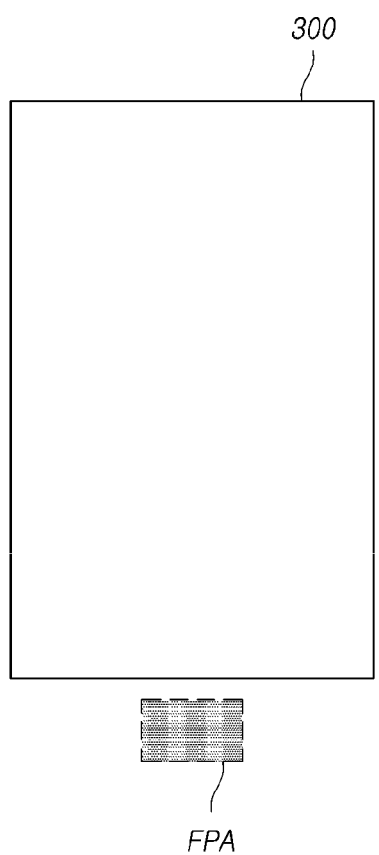
Figure 3C:
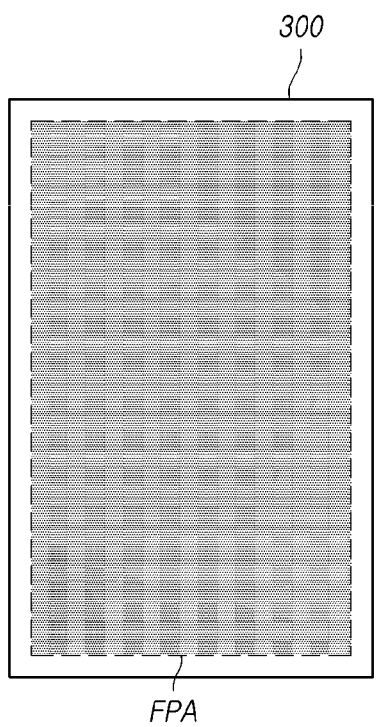

FIGS. 3A, 3B, and 3C are exemplary views illustrating a fingerprint sensing area of a touch display apparatus 100 according to the present embodiments.

Referring to FIG. 3A, a fingerprint sensing area FPA may be an internal area of an image display area 300.

Referring to FIG. 3B, a fingerprint sensing area FPA may be a part of an external area of the image display area 300.

Referring to FIG. 3C, a fingerprint sensing area FPA may correspond to the entire area of the image display area 300.

A fingerprint sensing area FPA may be on a front surface or a rear surface of the touch display apparatus 100, and may be on a side surface thereof, according to circumstances.

A fingerprint sensor may exist in the fingerprint sensing area FPA.

The fingerprint sensor may be disposed in the display panel 110, and may be disposed in a panel (sensor panel) different from the display panel 110, according to circumstances.

The touch display apparatus 100 according to the present embodiments uses a touch sensing structure on the basis of a pixel structure to perform touch sensing (touch position sensing or fingerprint sensing).

The pixel structure may be an actual pixel structure of a pixel capable of actually displaying an image, or a similar pixel structure of a pixel which does not actually display an image while having a structure similar to the actual pixel structure.

A touch sensing structure and a touch sensing principle on the basis of a pixel structure will be described below.

Figure 4:
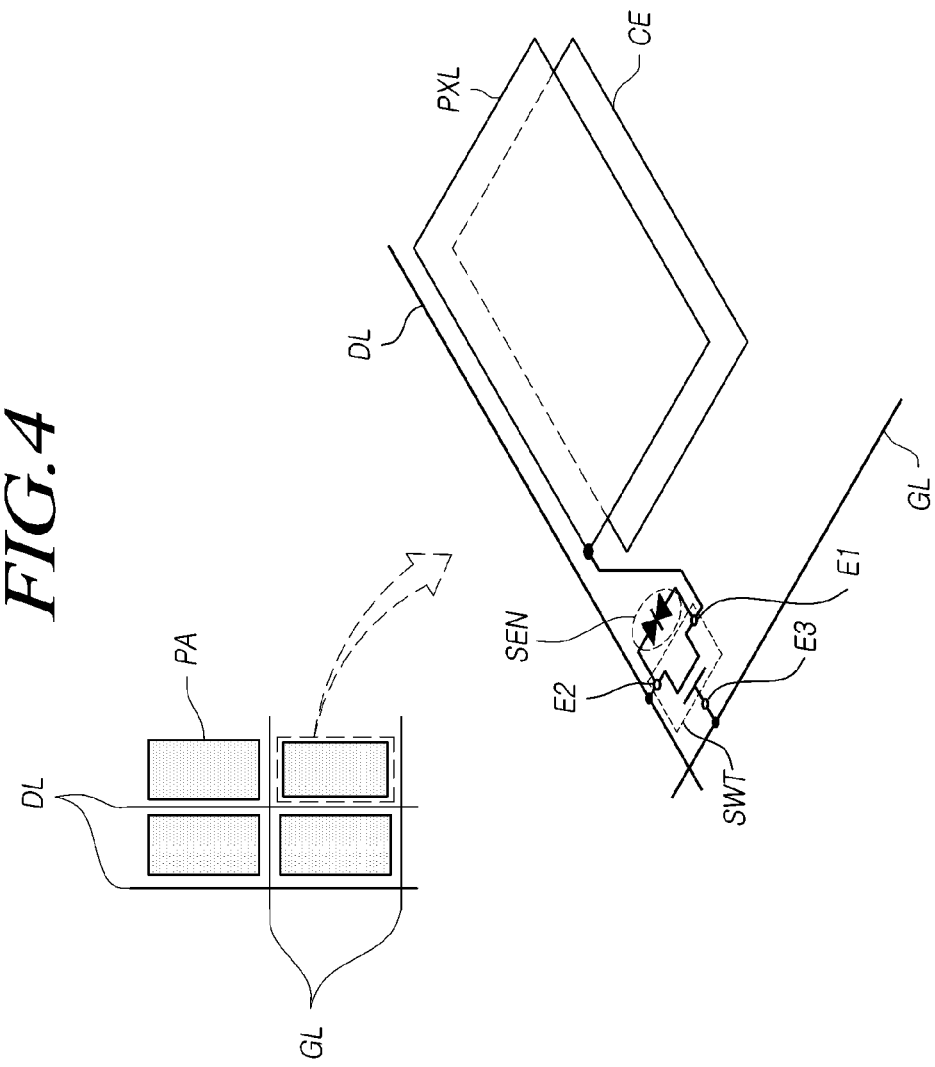
FIG. 4 is a diagram illustrating a touch sensing structure of a touch display apparatus according to the present embodiments.
Figure 5:
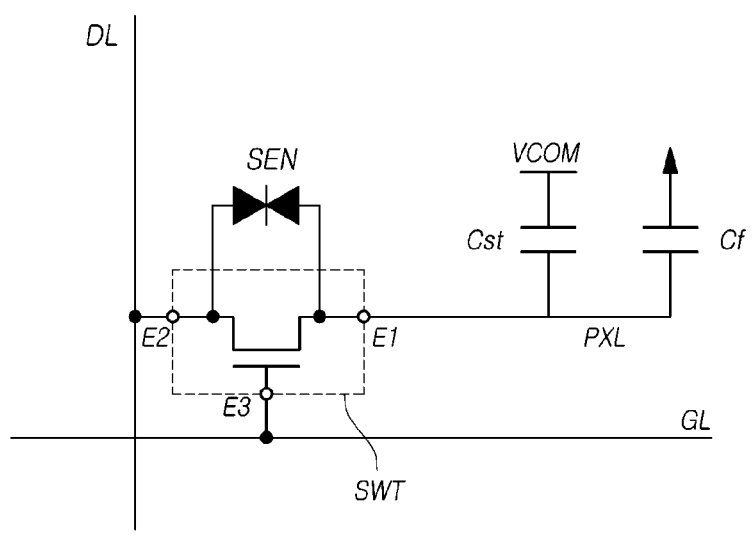
FIG. 5 is an equivalent circuit diagram for a touch sensing structure of a touch display apparatus according to the present embodiments.

FIG. 4 is a diagram illustrating a touch sensing structure of a touch display apparatus 100 according to the present embodiments, and FIG. 5 is an equivalent circuit diagram for a touch sensing structure of a touch display apparatus 100 according to the present embodiments.

Referring to FIG. 4, the display panel 110 of the touch display apparatus 100 according to the present embodiments has a touch sensing structure based on a pixel structure.

The display panel 110 of the touch display apparatus 100 according to the present embodiments may have a plurality of data lines DL and a plurality of gate lines GL arranged therein, and may have a plurality of pixels arranged therein, which are defined by the plurality of data lines DL and the plurality of gate lines GL.

In an area corresponding to each pixel, i.e. each pixel area PA, a pixel electrode PXL to which a data voltage (that is, a pixel voltage) corresponding to an image signal corresponding to a corresponding pixel is applied may be disposed.

Also, a switching transistor SWT that is electrically connected between a pixel electrode PXL and a data line DL may be disposed in each pixel area PA.

The switching transistor SWT transfers data voltage from the data line DL to the pixel electrode PXL in a turn-on state of the switching transistor SWT.

The switching transistor SWT may have a first electrode E1 electrically connected to the pixel electrode PXL, a second electrode E2 electrically connected to the data line DL, a third electrode E3 electrically connected to the gate line GL, and a semiconductor layer ACT, both ends of which are in contact with the first electrode E1 and the second electrode E2, respectively.

The switching transistor SWT may be controlled to be turned on or off according to a gate signal (also, referred to as a scan signal) of the third electrode E3 from the gate line GL.

In the switching transistor SWT, the first electrode E1 may be a drain electrode (a drain node) or a source electrode (a source node). The second electrode E2 may be a source electrode or a drain electrode. The third electrode E3 may be a gate electrode.

For convenience of explanation, the following description will be based on an assumption that the first electrode E1 is a drain electrode, the second electrode E2 is a source electrode, and the third electrode E3 is a gate electrode.

The switching transistor SWT may be an n-type transistor or a p-type transistor.

Meanwhile, referring to FIG. 4, a sensor pattern SEN, both ends of which are in direct contact or indirect contact via another pattern with the first electrode E1 and the second electrode E2 of the switching transistor SWT, may be disposed in each pixel area PA.

A pixel area PA in which a sensor pattern SEN exists may be disposed in only a partial area of the display panel 110, or may be dispersed and disposed in the entire area of the display panel 110.

In the following description, the sensor pattern SEN may be referred to as a sensor layer in view of the concept of lamination.

In the present embodiments, a touch sensing structure may include a pixel electrode PXL, a switching transistor SWT, and a sensor pattern SEN, arranged in each pixel area PA.

Also, in the present embodiments, the touch sensing structure may include a data line DL and a gate line GL.

Also, in the present embodiments, the sensor pattern SEN of the touch sensing structure may correspond to a touch sensor (i.e. a touch position sensor, a fingerprint sensor).

Meanwhile, a common electrode CE to which common voltage VCOM is applied may be disposed in the display panel 110.

A common electrode CE and each pixel electrode PXL may form a storage capacitor Cst that maintains a voltage required for displaying an image for one frame time interval.

Capacitance of a storage capacitor Cst in each pixel may be determined by a common voltage VCOM applied to the common electrode PXL and a pixel voltage (corresponding to a data voltage) applied to each pixel electrode PXL.

Meanwhile, when a user touches the display panel 110, a finger capacitor Cf may be formed between a finger and a pixel electrode PXL.

Capacitance of the finger capacitor Cf may be changed according to a location of the pixel corresponding to the touched portion.

Therefore, the touch display apparatus 100 may detect a difference in capacitance in order to detect whether there is a touch and/or detect a touch position.

Also, capacitance of the finger capacitor Cf may be changed according to a ridge which is a protruding portion in a fingerprint of a finger and a valley which is a groove portion between ridges.

Therefore, the touch display apparatus 100 may detect a difference in capacitance in order to detect fingerprint information including a pattern of a ridge and a valley of a fingerprint.

Meanwhile, the sensor pattern SEN described above has a property of responding to light, i.e. photosensitivity. The response to light (a light reaction) means that an electrical characteristic is changed.

The touch display apparatus 100 according to the present embodiments can sense a touch position and/or a fingerprint using photosensitivity of a sensor pattern SEN.

The sensor pattern SEN may be also referred to as an optical sensor or a photo sensor.

The touch sensing structure described above is based on a pixel structure. Therefore, there is no need to form a separate touch sensor (i.e. a touch position sensor, a fingerprint sensor) in the display panel 110 to sense a touch position and/or a fingerprint.

Accordingly, a display panel 110 in which a touch screen panel is embedded can be manufactured through a simple process and can have a thin thickness.

In addition, through the same touch sensing structure, both a touch position and a fingerprint can be sensed, so that said advantages can be further maximized.

Meanwhile, according to the touch sensing structure described above, both ends of the sensor pattern SEN are in contact with the first electrode E1 and the second electrode E2 of the switching transistor SWT, respectively. Therefore, the switching transistor SWT and sensor pattern SEN may be regarded as an integrated single device.

In this regard, there is a feature and a big advantage in that it is unnecessary to separately manufacture a switching device for driving a display, and a touch sensor device for sensing a touch.

The feature wherein one device performs both display driving and touch sensing will be described with reference to FIGS. 6 and 7.

Figure 6:
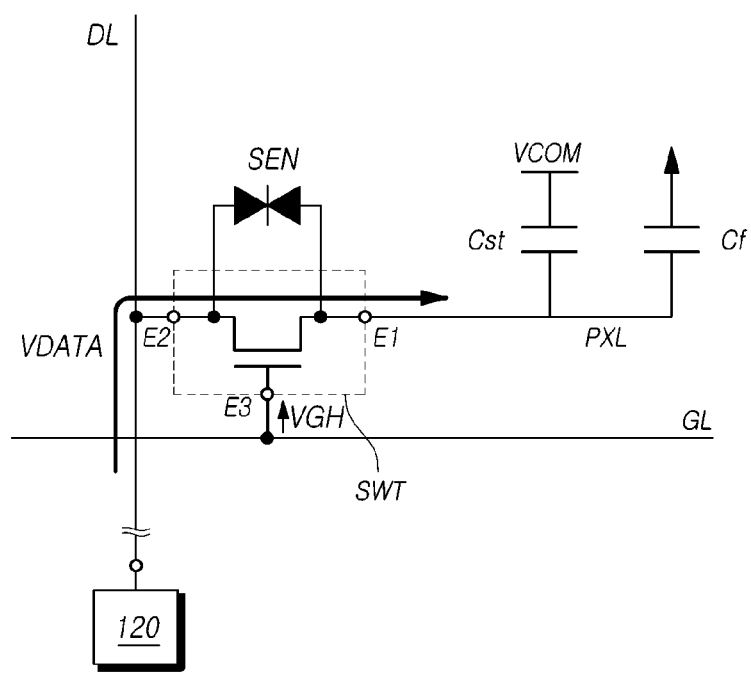
FIG. 6 is a diagram illustrating display driving of a touch display apparatus according to the present embodiments.
Figure 7:
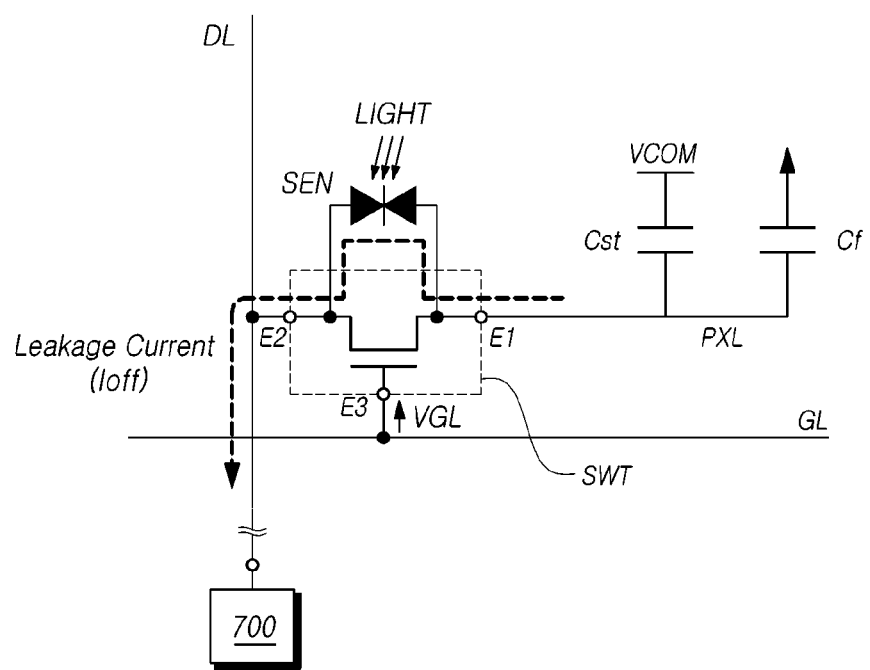
FIG. 7 is a diagram illustrating touch sensing of a touch display apparatus according to the present embodiments.

FIG. 6 is a diagram illustrating display driving of a touch display apparatus 100 according to the present embodiments, and FIG. 7 is a diagram illustrating touch sensing of a touch display apparatus 100 according to the present embodiments.

Referring to FIG. 6, a data driver circuit 120 drives a data line DL during a display driving interval, and a touch sensing circuit 700 performs driving and signal detecting which are required for touch sensing during a touch sensing interval.

An operation interval of the touch display apparatus 100 according to the present embodiments may include a display interval for displaying an image and a touch sensing interval for touch sensing (touch position sensing, fingerprint sensing).

Referring to FIG. 6, a timing in which a gate signal Vg of a turn-on level voltage (for example, VGH) capable of turning on the switching transistor SWT is supplied to a gate line GL is included in a display interval.

In a timing in which a gate signal Vg of a turn-on level voltage (for example, VGH) is supplied to a gate line GL, a switching transistor SWT is turned on and a data voltage VDATA output from the data driver circuit 120 to a data line DL is applied to a pixel electrode PXL through the turned-on switching transistor SWT.

Referring to FIG. 7, a timing in which a gate signal Vg of a turn-off level voltage (for example, VGL) capable of turning off the switching transistor SWT is applied to a gate line GL may be included in a touch sensing interval.

Specifically, in the touch sensing operation procedure, during a touch sensing interval, the touch sensing circuit 700 applies a driving voltage required for touch sensing to a pixel electrode PXL through the turned-on switching transistor SWT, in a state where the switching transistor SWT is turned on by a gate signal Vg of a turn-on level voltage (for example, VGH) applied to a gate line GL, before the switching transistor SWT is turned off.

After that, the gate driver circuit 130 supplies, to a gate line GL, a gate signal Vg of a turn-off level voltage (For example, VGL) capable of turning off the switching transistor SWT, to turn off the switching transistor SWT.

Then, light is irradiated to a sensor pattern SEN having photosensitivity.

Accordingly, the sensor pattern SEN reacts to the irradiated light, to change its electrical characteristic.

Therefore, an electric charge which is stored in a capacitor Cf or Cst connected to a pixel electrode PXL by a driving voltage applied to the pixel electrode PXL flows from the first electrode E1 to the second electrode E2 through the sensor pattern SEN. That is, a leakage current corresponding to the flowing electric charge is generated.

An amount of the leakage current may be changed according to a location relationship between a corresponding pixel electrode PXL and a finger.

In other words, a difference in leakage current may occur according to whether there is a touch. When there is a touch, a total reflection phenomenon of light does not occur in a position where a corresponding sensor pattern SEN exists, so that a characteristic of the light (for example, quantity of light) irradiated to a sensor pattern SEN is changed. Due to the change, an amount of leakage current through the sensor pattern SEN may be changed.

Therefore, the touch sensing circuit 700 can detect whether there is a touch and/or detect a touch position, on the basis of a difference in an amount of leakage current.

In addition, an amount of leakage current may be changed according to whether there is a ridge or a valley of a fingerprint in an area where a corresponding pixel electrode PXL exists.

The other words, a difference in leakage current may occur according to a ridge and a valley of a fingerprint. For example, the total reflection phenomenon of light may differently occur according to whether there is a ridge or a valley of a fingerprint. Therefore, a characteristic of light (for example, quantity of light) irradiated to a sensor pattern SEN is changed. Due to the change, an amount of leakage current through the sensor pattern SEN may be changed.

Therefore, the touch sensing circuit 700 can detect fingerprint information relating to a pattern and a shape of a ridge and a valley of a fingerprint on the basis of a difference in an amount of leakage current.

As described above, one device including both a switching transistor SWT and a sensor pattern SEN can perform both display driving and touch sensing.

That is, a touch sensing circuit 700 may detect touch information (touch position information, fingerprint information) on the basis of a difference in leakage current flowing to a data line DL through a sensor pattern SEN for each pixel area.

Therefore, a data line DL used for display driving may be used as a path to detect information required for touch sensing. Accordingly, a separate signal line electrically connecting a sensor pattern SEN corresponding to a touch sensor and a touch sensing circuit 700 is unnecessary.

The sensor pattern SEN described above may be referred to as an optical sensor (a photo sensor), and may be also referred to as a kind of switch which allows current (leakage current) to flow therethrough in a predetermined condition (light irradiation).

A specific touch sensing structure for sensing a touch in an optical method by using a sensor pattern SEN will be described in more detail.

Figure 8:
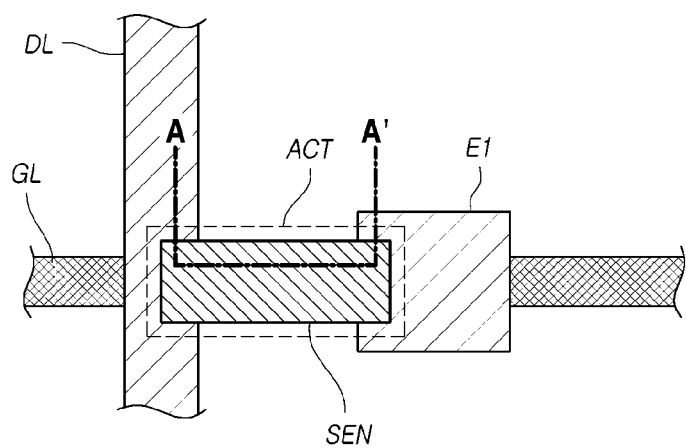
FIG. 8 is a plan view of a touch sensing structure according to the present embodiments.
Figure 9:
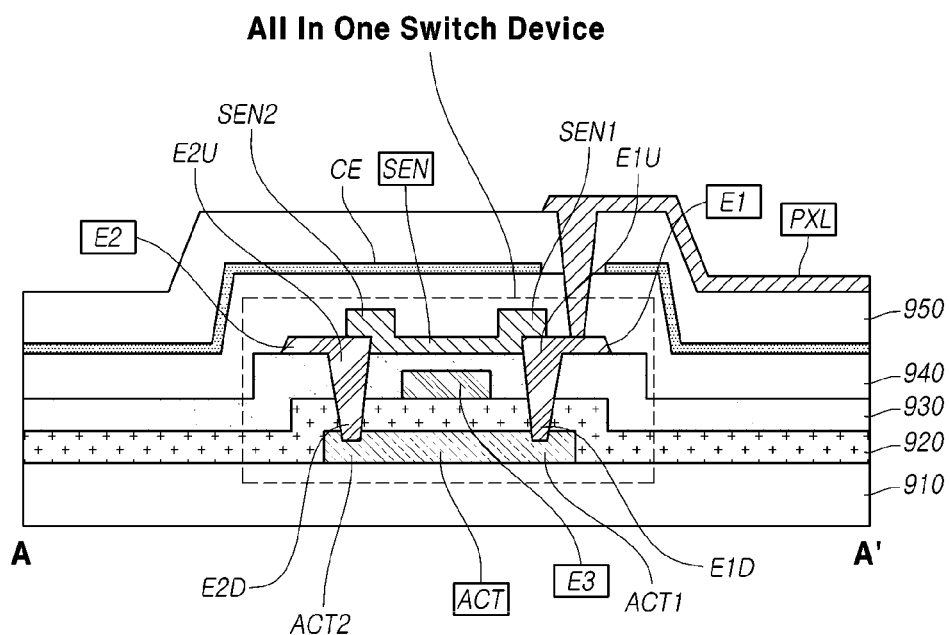
FIG. 9 is a sectional view of a touch sensing structure according to the present embodiments.

FIG. 8 is a plan view of a touch sensing structure according to the present embodiments, and FIG. 9 is a sectional view of a touch sensing structure according to the present embodiments.

Referring to FIG. 8, a semiconductor layer ACT is disposed above a sensor pattern SEN while overlapping the sensor pattern SEN. The semiconductor layer ACT may have an area larger than that of the sensor pattern SEN.

Referring to FIG. 9, the sectional structure along A-A' in FIG. 8 will be described.

A semiconductor layer ACT is disposed on a substrate 910.

A first insulation layer 920 is placed on the semiconductor layer ACT while covering the semiconductor layer ACT.

A third electrode E3 corresponding to a gate electrode is disposed on the first insulation layer 920.

A second insulation layer 930 is placed on the third electrode E3 while covering the third electrode E3.

A first electrode E1 and a second electrode E2 are disposed on the second insulation layer 930.

The first electrode E1 and the second electrode E2 are connected to a first end ACT1 and a second end ACT2 of the semiconductor layer ACT, respectively, through contact holes extending through the second insulation layer 930 and the first insulation layer 920.

A sensor pattern SEN is disposed on the second insulation layer 930 and has both ends connected to the first electrode E1 and the second electrode E2, respectively.

A first passivation layer 940 is placed on the sensor pattern SEN.

A common electrode CE is placed on the first passivation layer 940.

A second passivation layer 950 is placed on the common electrode CE.

A pixel electrode PXL is disposed on the second passivation layer 950.

The pixel electrode PXL is electrically connected to the first electrode E1 through a contact hole extending through all of the second passivation layer 950, the common electrode CE, and the first passivation layer 940.

The first end ACT1 of the semiconductor layer ACT is in contact with the first end E1D of the first electrode E1.

The second end ACT2 of the semiconductor layer ACT is in contact with the first end E2D of the second electrode E2.

The first end SEN1 of the sensor pattern SEN is in contact with the second end E1U of the first electrode E1.

The second end SEN2 of the sensor pattern SEN is in contact with the second end E2U of the second electrode E2.

Accordingly, the first electrode E1 is connected to both the first end ACT1 of the semiconductor layer ACT and the first end SEN1 of the sensor pattern SEN.

The second electrode E2 is connected to both the second end ACT2 of the semiconductor layer ACT and the second end SEN2 of the sensor pattern SEN.

Therefore, two types of electrical connection paths (a path through the semiconductor layer ACT, and a path through the sensor pattern SEN) may be established between the first electrode E1 and the second electrode E2.

Of course, the two types of electrical connection paths (a path through the semiconductor layer ACT, and a path through the sensor pattern SEN) do not open at the same time.

A switching transistor SWT has a top gate structure.

When a switching transistor SWT has a top gate structure in which a third electrode E2, which is a gate electrode, is disposed in the top part, the semiconductor layer ACT can have an excellent performance in mobility as compared to a bottom gate structure.

Meanwhile, a semiconductor layer ACT of the switching transistor SWT may include a p-type or n-type of Low-Temperature Polycrystalline Silicon (LTPS). That is, the switching transistor SWT may be an LTPS device.

As described above, a switching transistor SWT includes an LTPS device, so that the switching transistor SWT can not only have good mobility and fast response speed but also allows a thin bezel, a high resolution, a high aperture ratio, and a low power consumption.

Referring to FIG. 9, a sensor pattern SEN may be disposed above the third electrode E3 while the second insulation layer 930 is disposed between the sensor pattern SEN and the third electrode E3.

As described above, a sensor pattern SEN is disposed above the third electrode E3, so that a light receiving area in which light is irradiated to the sensor pattern SEN can be maximized. As a result, the maximized area can improve photosensitivity corresponding to a degree of light reaction of the sensor pattern SEN.

Besides, the sensor pattern SEN may have an area smaller than that of the third electrode E3 or identical to the third electrode E3.

Also, a part of the sensor patterns SEN disposed in the display panel 110 may have an area larger than an area of the third electrode E3 disposed under the part, another part of the sensor patterns SEN may have an area smaller than an area of the third electrode E3 disposed under the another part, and yet another part of the sensor patterns SEN may have an area identical to or similar to an area of the third electrode E3 disposed under the yet another part.

Meanwhile, a third electrode E3 may exist under a sensor pattern SEN in all the pixel areas PA disposed in the display panel 110. According to circumstances, a third electrode E3 may not exist under a sensor pattern SEN in a part of the pixel areas PA.

Referring to FIG. 9, one device including a switching transistor SWT and a sensor pattern SEN may be referred to as an all-in-one switch device.

An all-in-one switch device may include a first electrode E1 electrically connected to a pixel electrode PXL, a second electrode E2 electrically connected to a data line DL, a third electrode E3 electrically connected to a gate line GL, and a semiconductor layer ACT having a first end in contact with a first end of the first electrode E1 and a second end in contact with a first end of the second electrode E2, and a sensor pattern SEN having a first end in contact with a second end of the first electrode E1 and a second end in contact with a second end of the second electrode E2.

An all-in-one switch device has a switching transistor SWT and a sensor pattern SEN corresponding to two types of switch devices, which are integrated.

Therefore, an all-in-one switch device that is one device may provide two switching functions (a switching function for driving display, and a switching function for a sensor).

A process method for manufacturing a touch sensing structure of an optical method, which is the same as the structure in FIG. 9, will be briefly described.

A semiconductor layer ACT is placed on a substrate 910.

After that, a first insulation layer 920 covering the semiconductor layer ACT is placed thereon.

A third electrode E3 corresponding to a gate electrode is placed on the first insulation layer 920.

A second insulation layer 930 covering the third electrode E3 is placed thereon.

A contact hole extending through the second insulation layer 930 and the first insulation layer 920 is formed.

A first electrode E1 and the second electrode E2 are arranged on the second insulation layer 930.

The first electrode E1 and the second electrode E2 are connected to the first end ACT1 and the second end ACT2 of the semiconductor layer ACT, respectively, through contact holes.

Up to this point, the process method may be identical to an LTPS process.

After that, a sensor pattern SEN is deposited such that the sensor pattern SEN is disposed on the second insulation layer 930 while having both ends connected to the first electrode E1 and the second electrode E2, respectively.

A first passivation layer 940 is deposited on the sensor pattern SEN.

A common electrode CE is patterned on the first passivation layer 940.

A second passivation layer 950 is deposited on the common electrode CE.

A pixel electrode PXL is disposed on the second passivation layer 950.

A contact hole is foiled to extend through all of the second passivation layer 950, the common electrode CE, and the first passivation layer 940.

After that, a pixel electrode PXL is deposited.

The pixel electrode PXL is electrically connected to the first electrode E1 through the contact hole extending through all of the second passivation layer 950, the common electrode CE, and the first passivation layer 940.

Accordingly, an all-in-one switch device having a touch sensing structure of an optical method is formed.

Figure 10:
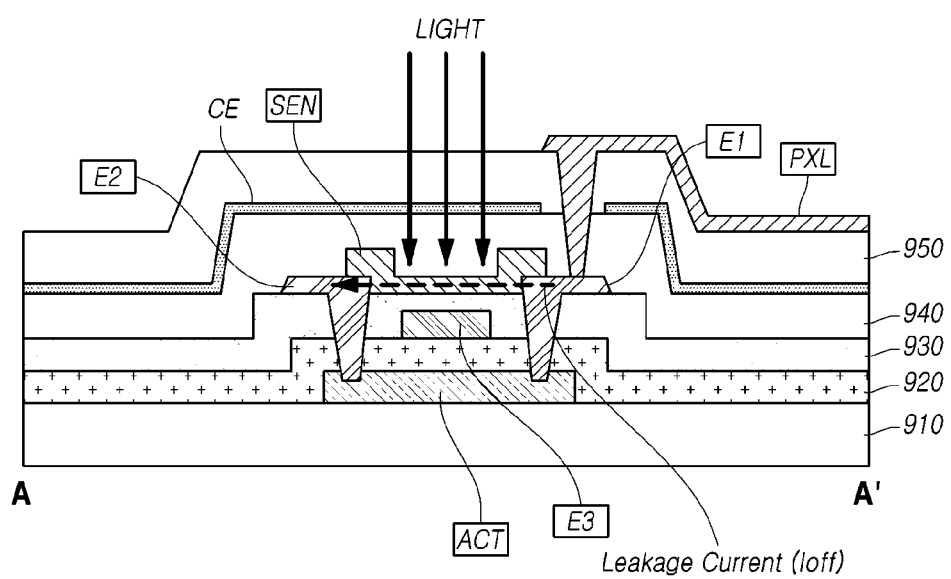
FIG. 10 is a diagram illustrating a photosensitive feature and an electrical characteristic resulting therefrom, of a touch sensing structure according to the present embodiments.

FIG. 10 is a diagram illustrating a photosensitive feature and an electrical characteristic resulting therefrom, of a touch sensing structure according to the present embodiments.

Referring to FIG. 10, the sensor pattern SEN may include a photosensitive material.

Therefore, when light is irradiated to the sensor pattern SEN, the sensor pattern SEN reacts to the light so as to allow current to flow therethrough.

When a current flows from the first electrode E1 to the second electrode E2 through the sensor pattern SEN in a state where the switching transistor SWT is turned off by a turn-off level voltage applied to the third electrode E3 which is a gate electrode, the current flowing through the sensor pattern SEN corresponds to a leakage current.

The leakage current will be denoted by "Ioff" below.

As described above, the sensor pattern SEN has photosensitivity, so that a touch position and a fingerprint can be sensed by using the sensor pattern SEN.

Figure 11:
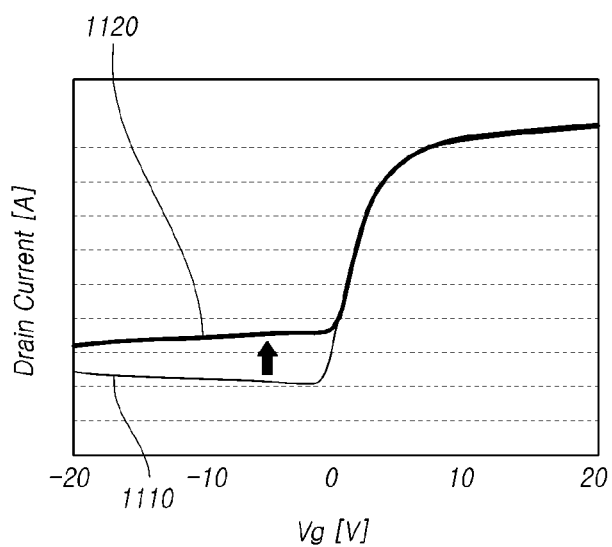
FIG. 11 is a graph exhibiting photosensitivity of a touch sensing structure according to the present embodiments.

FIG. 11 is a graph exhibiting photosensitivity of a touch sensing structure according to the present embodiments.

In the graph of FIG. 11, the x-axis indicates a gate voltage Vg applied to a third electrode E3 corresponding to a gate electrode of a switching transistor SWT, and the y-axis indicates a drain current flowing to a first electrode E1 or a second electrode E2 corresponding to a drain electrode.

In the case where light is not irradiated into the sensor pattern SEN (operation 1110), when a gate voltage Vg is lowered, the switching transistor SWT is turned off and then a drain current becomes almost zero.

The situation of the case (operation 1110) is similar to that of the case where there is no sensor pattern SEN or the case where a light to which a sensor pattern SEN can't react is irradiated to the sensor pattern SEN.

In the case where a light to which a sensor pattern SEN can react is irradiated to the sensor pattern SEN (operation 1120), when a gate voltage Vg is lowered, the switching transistor SWT is turned off so that the semiconductor layer ACT does not have a channel formed therein. In spite of that, leakage current Ioff is generated through the sensor pattern SEN, so that some drain current flows.

That is, it can be confirmed that the sensor pattern SEN has reacted to the light in the case where a light to which a sensor pattern SEN can react is irradiated to the sensor pattern SEN (operation 1120).

An amount of a drain current in a range of a gate voltage having a turn-off level indicates a degree of light reaction (photosensitivity).

Figure 12:
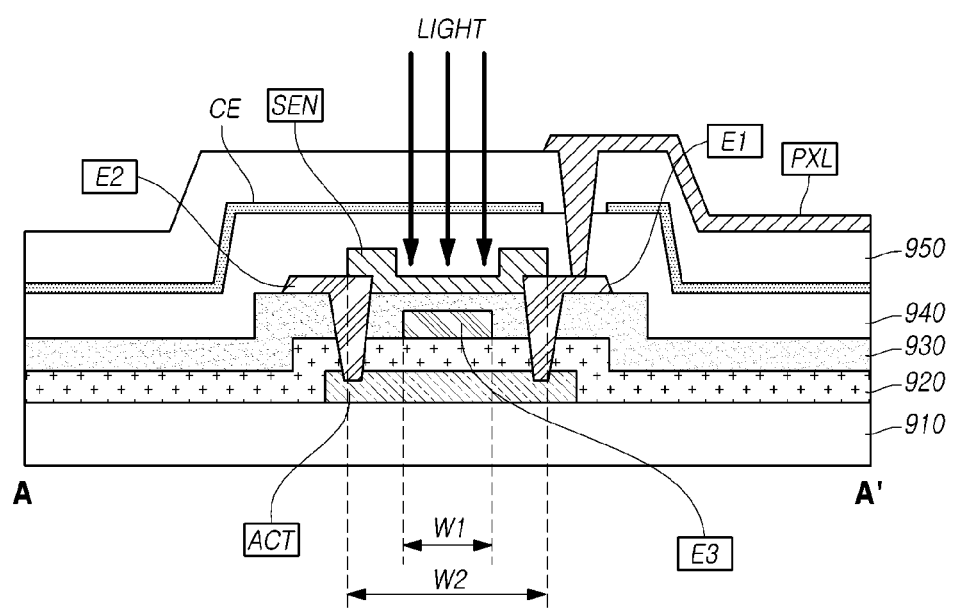
FIG. 12 is a diagram illustrating a structural feature of a touch sensing structure according to the present embodiments.

FIG. 12 is a diagram illustrating a structural feature of a touch sensing structure according to the present embodiments.

Referring to FIG. 12, a semiconductor layer ACT may have some degree of photosensitivity (a degree of light reaction), but not as much as photosensitivity as the sensor pattern SEN.

However, when the switching transistor SWT is an LTPS device having a top gate structure, an irradiated light is blocked by a third electrode E3 which is a gate electrode. Therefore, the semiconductor layer ACT can't receive much light.

That is, when the switching transistor SWT is an LTPS device having a top gate structure, a light receiving area of the semiconductor layer ACT is significantly small.

Therefore, it is difficult to use a switching transistor SWT itself as an optical sensor (a photo sensor) by using photosensitivity of the semiconductor layer ACT.

In the touch sensing structure according to the present embodiments, the sensor pattern SEN is placed above the third electrode E3.

The sensor pattern SEN has an area (corresponding to a width W2) larger than that (corresponding to a width W1) of the third electrode E3.

Therefore, the sensor pattern SEN can retain the considerably large light receiving area, so that a touch can be precisely sensed by maximizing of photosensitivity of the sensor pattern SEN.

That is, the sensor pattern SEN has a large light receiving area and thus has a large degree of photosensitivity (a degree of light reaction). Accordingly, the sensor pattern SEN can have a large amount of leakage current, and can exhibit a large difference in leakage current according to whether there is a touch or according to a ridge or a valley of a fingerprint. Therefore, a touch position or a fingerprint can be precisely sensed.

Figure 13:
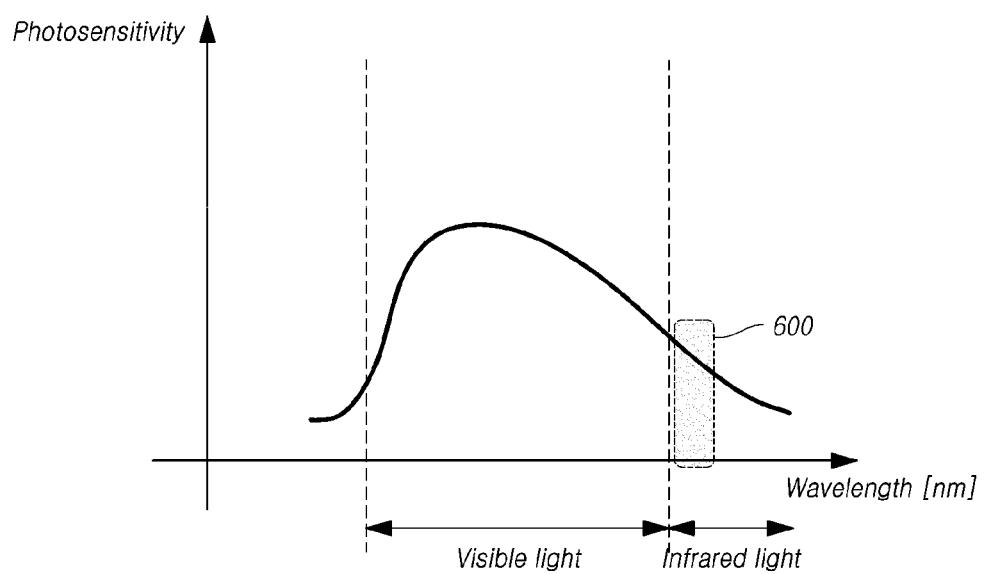
FIG. 13 is a graph showing a photosensitivity with respect to a light wavelength of a sensor pattern in a touch sensing structure according to the present embodiments.

FIG. 13 is a graph showing a photosensitivity with respect to a light wavelength of a sensor pattern SEN in a touch sensing structure according to the present embodiments.

Referring to FIG. 13, when a visible light is irradiated into the sensor pattern SEN, the sensor pattern SEN has photosensitivity larger than the case when an infrared light is irradiated to the sensor pattern SEN.

When a visible light is irradiated into the sensor pattern SEN, a user may visually recognize the irradiated visible light.

Therefore, in order to make a sensor pattern SEN react without a visible recognition phenomenon of light irradiated to the sensor pattern SEN, light irradiation may be performed by using a light in the lowest wavelength range 600 nm of the infrared wavelength band.

However, in the case where there is a structure in which light irradiated to the sensor pattern SEN is not visually recognized by a user, in the case where there is no issue even if the user does visually recognize the light, or in the case where a phenomenon of the user recognizing the light is used in reverse, the sensor pattern SEN may react to a visible light.

Therefore, a wavelength band of a light to be irradiated to the sensor pattern SEN can be determined according to a degree of photosensitivity, various conditions, and a concept of design.

According to a wavelength of the light to be used, a photosensitive material of the sensor pattern SEN may be varied.

For example, a photosensitive material included in the sensor pattern SEN may include a photosensitive material having a changing electrical characteristic when an infrared light is irradiated thereto. The phrase "the having a changing electrical characteristic" may mean that the sensor pattern SEN has conductivity, and the sensor pattern SEN can allow current to flow therethrough.

As described above, when a sensor pattern SEN including a photosensitive material suitable for the case where an infrared light is used as an irradiation light is used, photosensitivity of the sensor pattern SEN is increased, so that a touch sensing performance can be improved.

For another example, a photosensitive material included in the sensor pattern SEN may include a photosensitive material having a changing electrical characteristic when a visible light is irradiated thereto.

As described above, when a sensor pattern SEN including a photosensitive material suitable for the case where a visible light is used as an irradiation light is used, photosensitivity of the sensor pattern SEN is increased, so that a touch sensing performance can be improved.

Meanwhile, a photosensitive material having a changing electrical characteristic when receiving an infrared light may also have a changing electrical characteristic when receiving a visible light.

Figure 14:
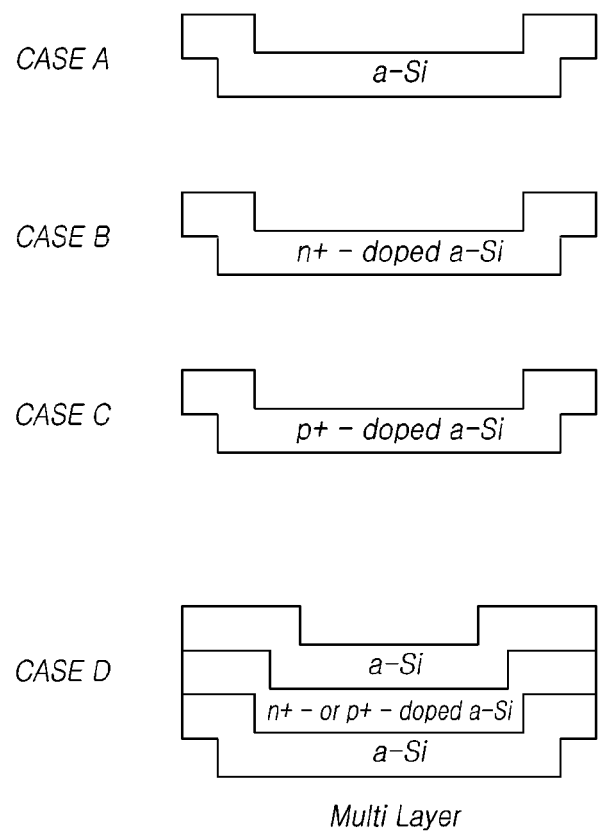
FIG. 14 is a diagram illustrating examples of implementing a sensor pattern in a touch sensing structure according to the present embodiments.
Figure 15:
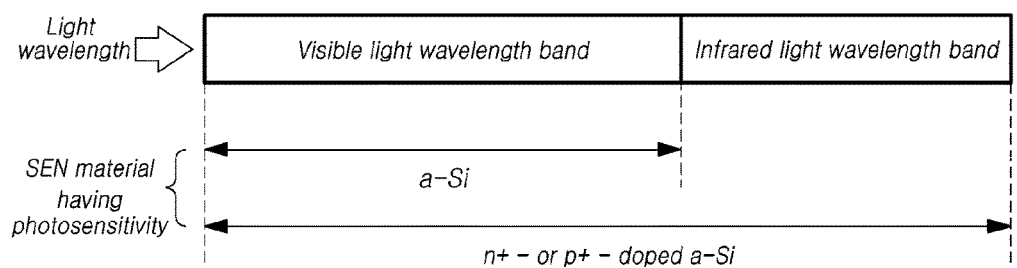
FIG. 15 is an exemplary diagram illustrating a material of a sensor pattern, which has photosensitivity for each light wavelength band, in a touch sensing structure according to the present embodiments.

FIG. 14 is a diagram illustrating examples of implementing a sensor pattern SEN in a touch sensing structure according to the present embodiments, and FIG. 15 is an exemplary diagram illustrating a material of a sensor pattern SEN, which has photosensitivity for each light wavelength band, in a touch sensing structure according to the present embodiments.

For example, the sensor pattern SEN may include amorphous silicon (a-Si) (CASE A).

As described above, when the sensor pattern SEN including amorphous silicon (a-Si) is used, a visible light (for example, a green light having a wavelength of approximately 525 nm) is used as an irradiation light to generate a photo current (leakage current), so that a touch position or a fingerprint can be sensed.

For another example, the sensor pattern SEN may include amorphous silicon to which $n^+$ is additionally doped (CASE B).

For yet another example, the sensor pattern SEN may include amorphous silicon to which $p^+$ is additionally doped (CASE C).

As described above, when the sensor pattern SEN including an amorphous silicon to which $n^+$ or $p^+$ is additionally doped is used, an infrared light as well as a visible light may be used as an irradiation light to generate a photo current (leakage current), so that a touch position or a fingerprint can be sensed.

Meanwhile, as described above, the sensor pattern SEN may be formed of a single material layer, but may include two or more layers made of different materials.

For example, the sensor pattern SEN may be formed of a multi-layer which includes a layer including amorphous silicon (a-Si), a layer including $n^+$- or $p^+$-doped amorphous silicon, and a layer including amorphous silicon (a-Si) (CASE D).

In this case, all the advantages which both two layers made of different materials have can be used. For example, external visual recognition can be prevented by using an infrared light as an irradiation light, and high photosensitivity of the sensor pattern SEN can be obtained by using a visible light as an irradiation light. Therefore, touch sensing is further precisely performed by using said advantages.

Figure 16:
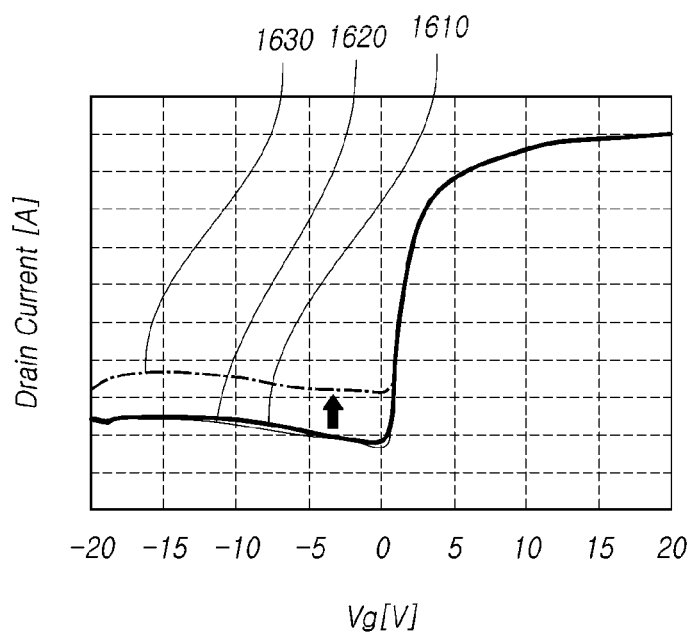
FIG. 16 is a graph exhibiting photosensitivity of a sensor pattern including amorphous silicon in three types of light irradiating situations, in a touch sensing structure according to the present embodiments.

FIG. 16 is a graph exhibiting photosensitivity of a sensor pattern SEN including amorphous silicon (a-Si) in three types of light irradiating situations, in a touch sensing structure according to the present embodiments.

In FIG. 16, curve 1610 indicates a change of a drain current while a gate voltage Vg is changed, in the case where a light is not irradiated to the sensor pattern SEN including amorphous silicon (a-Si).

Alternatively, curve 1610 may indicate a change of a drain current while a gate voltage Vg is changed, in the case where there is no sensor pattern SEN.

Curve 1620 indicates a change of a drain current while a gate voltage Vg is changed, in the case where an infrared light is irradiated to the sensor pattern SEN including amorphous silicon (a-Si).

Curve 1630 indicates a change of a drain current while a gate voltage Vg is changed, in the case where a visible light (for example, a green light) is irradiated to the sensor pattern SEN including amorphous silicon (a-Si).

In the three cases (1610, 1620, and 1630), the sensor patterns SEN including amorphous silicon (a-Si) exhibit the same degree of photosensitivity (a degree of light reaction) in a range of a turn-on level voltage in which a gate voltage Vg is higher than 0 [V]. However, the sensor patterns SEN exhibit different degrees of photosensitivity according to types of light, in a range of a turn-off level voltage in which a gate voltage Vg is lower than 0 [V].

An amount of a drain current reflects the photosensitivity.

Referring to FIG. 16, like the case of curves 1610 and 1620, when a light is not irradiated to or when an infrared light is irradiated to the sensor pattern SEN including amorphous silicon (a-Si), the sensor pattern SEN including amorphous silicon (a-Si) does not react or barely reacts to light. Therefore, a drain current (a leakage current) is not generated in a range of a turn-off level voltage in which a gate voltage Vg is lower than 0 [V].

However, like the case of curve 1630, when a visible light is irradiated to the sensor pattern SEN including amorphous silicon (a-Si), a drain current is generated in a range of a turn-off level voltage in which a gate voltage Vg is lower than 0 [V].

The drain current generated like this occurs by the sensor pattern SEN reacting to the visible light, and corresponds to a leakage current Ioff leaking through the sensor pattern SEN which has reacted to light.

Therefore, when a visible light should be used as an irradiation light, it would be appropriate to form a sensor pattern SEN using amorphous silicon (a-Si).

On the contrary, when a sensor pattern SEN should be formed using amorphous silicon (a-Si), a visible light should be selected as a light to be irradiated to the sensor pattern SEN.

Figure 17:
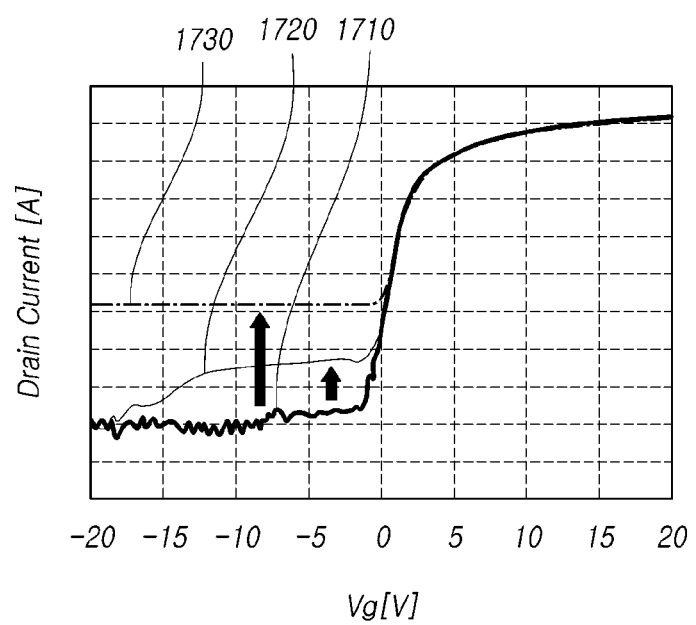
FIG. 17 is a graph exhibiting photosensitivity of a sensor pattern including $n^+$- or $p^+$-doped amorphous silicon in three types of light irradiating situations, in a touch sensing structure according to the present embodiments.

FIG. 17 is a graph exhibiting photosensitivity of a sensor pattern SEN including $n^+$- or $p^+$-doped amorphous silicon (a-Si) in three types of light irradiating situations, in a touch sensing structure according to the present embodiments.

In FIG. 17, curve 1710 indicates a change of a drain current while a gate voltage Vg is changed, in the case where a light is not irradiated to the sensor pattern SEN including $n^+$ or $p^+$-doped amorphous silicon (a-Si).

Alternatively, curve 1710 may indicate a change of a drain current while a gate voltage Vg is changed, in the case where there is no sensor pattern SEN.

Curve 1720 indicates a change of a drain current while a gate voltage Vg is changed, in the case where an infrared light is irradiated to the sensor pattern SEN including $n^+$- or $p^+$-doped amorphous silicon (a-Si).

Curve 1730 indicates a change of a drain current while a gate voltage Vg is changed, in the case where a visible light (for example, a green light) is irradiated to the sensor pattern SEN including $n^+$- or $p^+$-doped amorphous silicon (a-Si).

In the three cases (1710, 1720, and 1730), the sensor patterns SEN including $n^+$- or $p^+$-doped amorphous silicon (a-Si) exhibit the same degree of photosensitivity (a degree of light reaction) in a range of a turn-on level voltage in which a gate voltage Vg is higher than 0 [V]. However, the sensor patterns SEN exhibit different degrees of photosensitivity (a degree of light reaction) according to types of light, in a range of a turn-off level voltage in which a gate voltage Vg is lower than 0 [V].

An amount of a drain current reflects the photosensitivity.

Referring to FIG. 17, like the case of curve 1710, when a light is not irradiated to the sensor pattern SEN including $n^+$- or $p^+$-doped amorphous silicon (a-Si), the sensor pattern SEN including $n^+$- or $p^+$-doped amorphous silicon (a-Si) does not react to light. Therefore, a drain current (a leakage current) is not generated in a range of a turn-off level voltage in which a gate voltage Vg is lower than 0 [V].

However, like the case of curve 1720, when an infrared light is irradiated to the sensor pattern SEN including $n^+$- or $p^+$-doped amorphous silicon (a-Si), a drain current is generated in a range of a turn-off level voltage in which a gate voltage Vg is lower than 0 [V].

The drain current generated like this occurs by the sensor pattern SEN reacting to the infrared light, and corresponds to a leakage current Ioff leaking through the sensor pattern SEN which has reacted to light.

In addition, like the case of curve 1730, when a visible light is irradiated to the sensor pattern SEN including $n^+$- or $p^+$-doped amorphous silicon (a-Si), a drain current larger than that of curve 1720 is generated in a range of a turn-off level voltage in which a gate voltage Vg is lower than 0 [V].

The drain current generated like this occurs by the sensor pattern SEN reacting to the visible light, and corresponds to a leakage current Ioff leaking through the sensor pattern SEN which has reacted to light.

Therefore, when there is no issue with using either wavelength of light between an infrared light and a visible light as an irradiation light, it is preferable to select a visible light, as an irradiation light, about which the sensor pattern SEN including $n^+$- or $p^+$-doped amorphous silicon (a-Si) exhibits a larger light reaction.

In addition, when a visible light is irradiated to the sensor pattern SEN, a user visually recognizes the irradiated light released to the outside of the touch display apparatus 100. When, by using the visual recognizing property in reverse, a product in which a light having a desired color is visible from outside the fingerprint sensing area FPA in aesthetic point of view is developed, a visible light about which the sensor pattern SEN including $n^+$- or $p^+$-doped amorphous silicon (a-Si) exhibits the largest light reaction may be selected as an irradiation light.

Meanwhile, in order to prevent the irradiated light from being released outside of the touch display apparatus 100 and being visually recognized by a user when a visible light is irradiated to the sensor pattern SEN, there is no issue even if an infrared light which allows some degrees of reaction to light is selected as an irradiation light.

Figure 18:
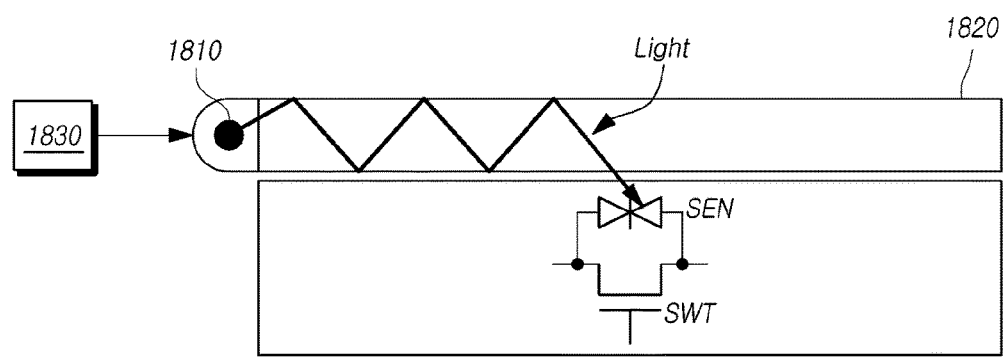
FIG. 18 is a diagram illustrating a light irradiation device of a touch display apparatus according to the present embodiments.

FIG. 18 is a diagram illustrating a light irradiation device of a touch display apparatus 100 according to the present embodiments.

Referring to FIG. 18, a touch display apparatus 100 according to the present embodiments may include a light irradiation device to irradiate light to the sensor pattern SEN.

The light irradiation device may include a light output device 1810 that outputs light to be irradiated to the sensor pattern SEN and a light output control device 1830 that controls light output timing of the light output device 1810.

The light output control device 1830 may output a control signal such that the light output device 1810 outputs light in a timing (light output timing) required for light irradiation.

A light can be irradiated to the sensor pattern SEN using the light output device 1810, and a timing in which a light is irradiated to the sensor pattern SEN is controlled using the light output control device 1830, so that touch sensing of an optical method is possible.

In light output timing, a switching transistor SWT should be in a turn-off state.

Accordingly, a leakage current through the sensor pattern SEN can be measured.

The light output control device 1830 may be included in the touch sensing circuit 700.

Also, the light output control device 1830 may be a controller 140 in FIG. 1.

The light output device 1810 described above may be placed outside of the display panel 110.

Meanwhile, the light irradiation device may further include a light guide member 1820 that guides a light output from the light output device 1810 to an area in which the sensor pattern SEN is disposed.

A light output from the light output device 1810 may be guided to an area in which the sensor pattern SEN is located while being totally reflected according to the light guide member 1820.

Therefore, when a touch sensing area (fingerprint sensing area) in which the sensor pattern SEN exists is separated from the light output device 1810, the light guide member 1820 can transfer a light output from the light output device 1810 to the sensor pattern SEN.

The light guide member 1820 may be placed on a layer in which a switching transistor SWT is placed.

In addition, the light guide member 1820 may be placed in the entire area or a partial area of the display panel 110.

As described above, the light guide member 1820 may be vertically or horizontally placed, and thus can efficiently transfer light to the sensor pattern SEN.

Figure 19:
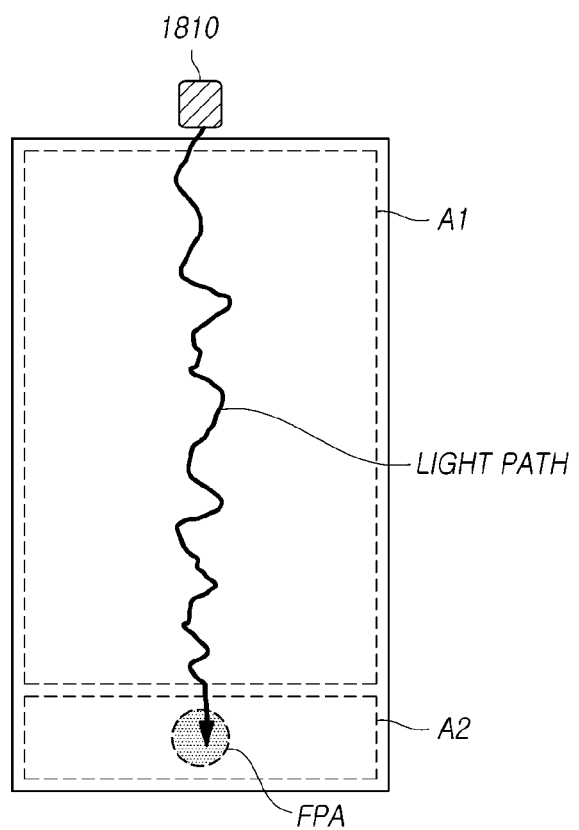
FIG. 19 is an exemplary diagram of a light irradiation device for fingerprint sensing, in a touch display apparatus according to the present embodiments.

FIG. 19 is an exemplary diagram of a light irradiation device for fingerprint sensing of touch sensing, in a touch display apparatus 100 according to the present embodiments.

Referring to FIG. 19, the display panel 110 may include a first area A1 and a second area A2.

A pixel area PA in which a sensor pattern SEN exists may be included in the second area A2.

That is, a fingerprint sensing area FPA may be included in the second area A2.

A light output from the light output device 1810 may be irradiated to the sensor pattern SEN placed in the second area A2 through the light guide member 1820 placed in all or a part of the first area A1.

An image display area 300 may include the first area A1. The image display area 300 may further include the second area A2, as well as the first area A1.

A pixel area PA in which a sensor pattern SEN exists may be included in the fingerprint sensing area FPA.

As described above, when the light output device 1810 is separated from the fingerprint sensing area FPA, the light guide member 1820 efficiently transfers light to the sensor pattern SEN, so that fingerprint sensing is possible.

Figure 20:
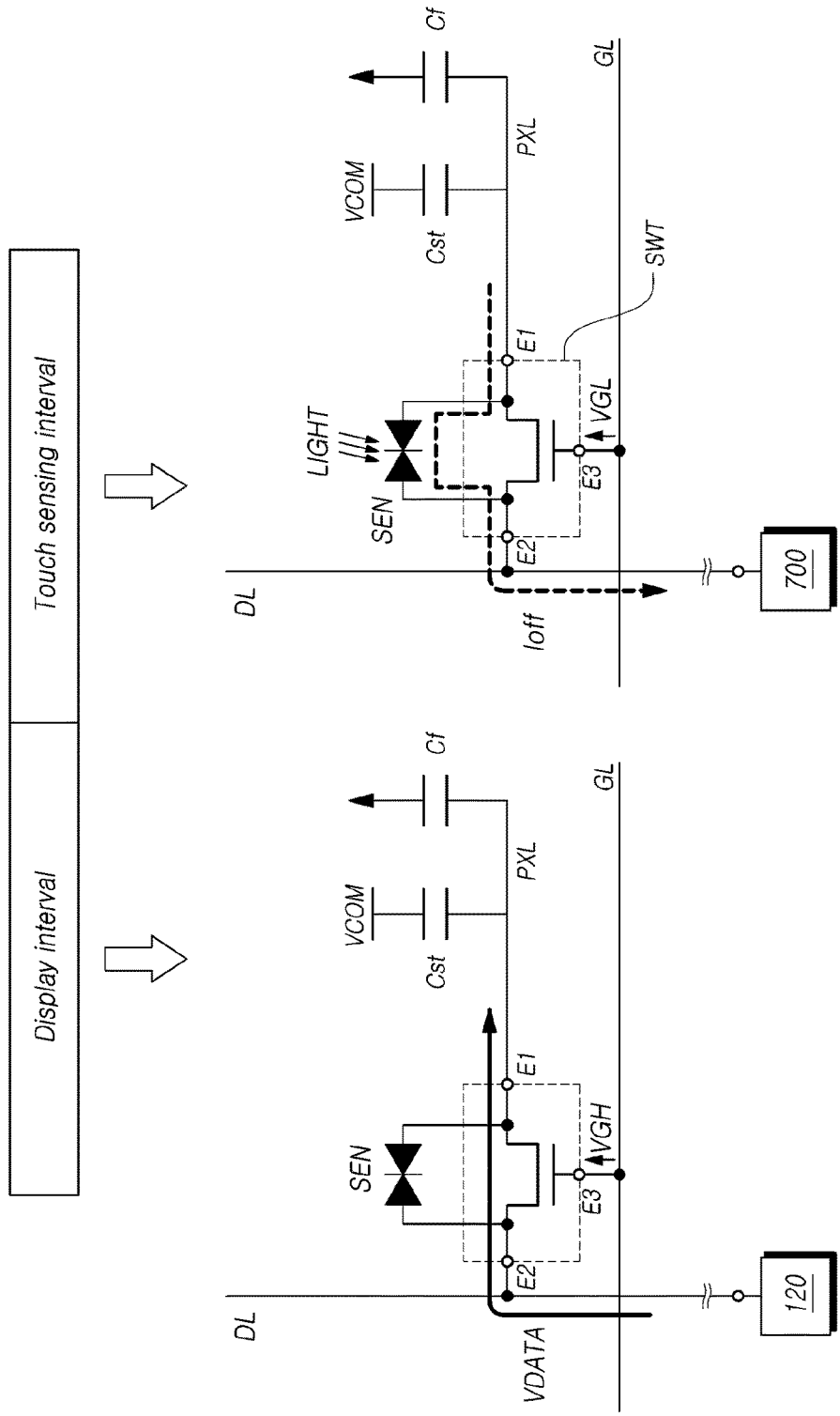
FIG. 20 is a diagram illustrating an operation mode of a touch display apparatus according to the present embodiments.

FIG. 20 is a diagram illustrating an operation mode of a touch display apparatus 100 according to the present embodiments.

Referring to FIG. 20, the touch display apparatus 100 according to the present embodiments may operate in a display mode for image displaying and in a touch sensing mode for touch sensing.

In other words, an operation mode of the touch display apparatus 100 according to the present embodiments may be a display mode or a touch sensing mode.

Therefore, the touch display apparatus 100 time-divides an operation interval into a display interval for image displaying and a touch sensing interval for touch sensing, and performs display driving in the display interval and touch sensing in the touch sensing interval.

In the display interval, there is a timing in which a gate signal Vg of a turn-on level voltage (for example, VGH) is supplied to a gate line GL.

In the touch sensing driving, there is a timing (light output timing) in which light is irradiated to the sensor pattern SEN when a gate signal Vg of a turn-off level voltage (for example, VGL) is supplied to a gate line GL.

Figure 21:
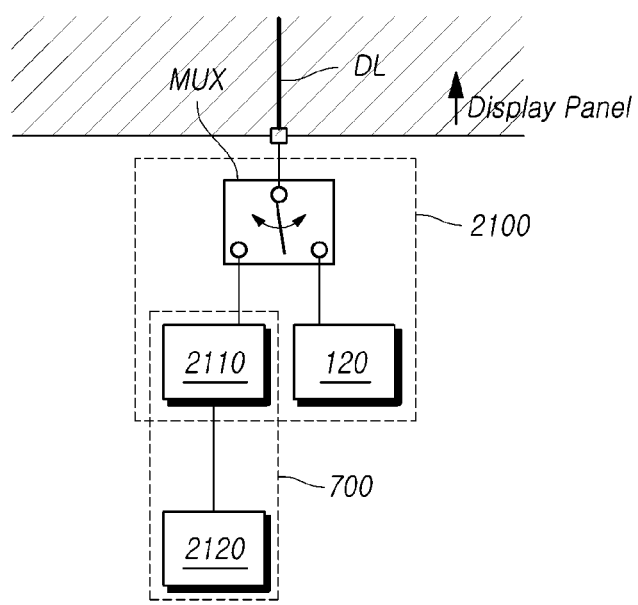
FIG. 21 is a diagram illustrating a driver circuit of a touch display apparatus according to the present embodiments.

FIG. 21 is a diagram illustrating a driver circuit of a touch display apparatus 100 according to the present embodiments.

Referring to FIG. 21, before a light is irradiated to the sensor pattern SEN, the touch sensing circuit 700 should output driving voltage required for touch sensing in a state where a switching transistor SWT is turned on, and then should apply the driving voltage to the pixel electrode PXL through the data line DL.

After that, the switching transistor SWT is turned off and light is irradiated to the sensor pattern SEN.

Then, a leakage current Ioff is generated through the sensor pattern SEN, and the generated leakage current Ioff flows to the data line DL.

The touch sensing circuit 700 may receive the leakage current Ioff flowing through the data line DL or information (electric charge or voltage) corresponding to the flowing leakage current Ioff, and may detect a touch position or fingerprint information on the basis of the received leakage current Ioff or the corresponding information.

The touch sensing circuit 700 may include a touch driving circuit 2110 that outputs driving voltage and receives the leakage current Ioff flowing through the data line DL or information (electric charge or voltage) corresponding to the flowing leakage current Ioff and a touch processor 2120 that detects a touch position or fingerprint information on the basis of the received leakage current Ioff or the corresponding information.

Meanwhile, as described above, the data line DL is a signal wire for touch sensing, as well as an image signal wire through which a data voltage corresponding to an image signal is supplied to a pixel during driving of a display for image displaying.

Therefore, a touch driving circuit 2110 and a data driver circuit 120 should share the data line DL.

That is, the data line DL should be connected to one of the touch driving circuit 2110 and the data driver circuit 120 according to an operation state (display driving, touch sensing).

Therefore, a driver circuit of the touch display apparatus 100 according to the present embodiments may further include a switching device MUX that connects the data line DL to one of the touch driving circuit 2110 and the data driver circuit 120.

Meanwhile, the touch driving circuit 2110, the data driver circuit 120, and the switching device MUX may be implemented as one driver integrated circuit 2100.

The present embodiments described above may provide an all-in-one switch device, and a touch display apparatus 100 and a display panel 110 including the same, wherein the all-in-one switch device can perform a switching function for display driving and a sensor function for sensing a touch position and/or a fingerprint.

The present embodiments may provide a touch display apparatus 100, a display panel 110, and an all-in-one switch device, which can precisely sense a touch position and/or a fingerprint without having a separate touch sensor having a big size.

The present embodiments may provide a touch display apparatus 100, a display panel 110, and an all-in-one switch device, which can precisely sense a touch position and/or a fingerprint without being affected by parasitic capacitance.

The present embodiments may provide a touch display apparatus 100, a display panel 110, and an all-in-one switch device, which can precisely sense a touch position and/or a fingerprint even in a situation where a system has a structure or a circuit in which touch sensing based on capacitance is impossible.

The present embodiments may provide a touch display apparatus 100, a display panel 110, and an all-in-one switch device, which can precisely sense a touch position and/or a fingerprint through an optical method.

The present embodiments may provide a touch display apparatus 100, a display panel 110, and an all-in-one switch device, which can precisely sense a touch position and/or a fingerprint while exhibiting good mobility and fast response speed and having a thin bezel, a high resolution, a high aperture ratio, and a low power consumption.

It will be apparent to those skilled in the art that various modifications and variations can be made in the touch display apparatus, the display panel, and all-in-one switch device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display apparatus, comprising:
   a display panel including:
      a data line and a gate line arranged therein; and
      a pixel electrode disposed in a pixel area defined by the data line and the gate line,
   wherein the pixel area includes a switching transistor and a sensor pattern arranged therein,
   wherein the switching transistor includes:
      a first electrode electrically connected to the pixel electrode,
      a second electrode electrically connected to the data line,
      a third electrode electrically connected to the gate line, and
      a semiconductor layer, both ends of which are in contact with the first electrode and the second electrode, respectively,
   wherein both ends of the sensor pattern directly electrically contact the first electrode and the second electrode, respectively, and
   wherein the sensor pattern completely overlaps the semiconductor layer.

2. The touch display apparatus of claim 1, wherein:
   the semiconductor layer includes:
      a first end in contact with a first end of the first electrodes, and
      a second end in contact with a first end of the second electrode; and
   the sensor pattern includes:
      a first end in contact with a second end of the first electrodes; and
      a second end in contact with a second end of the second electrode.

3. The touch display apparatus of claim 1, wherein the switching transistor has a top gate structure.

4. The touch display apparatus of claim 1, wherein the semiconductor layer includes a p-type or n-type low-temperature polycrystalline silicon.

5. The touch display apparatus of claim 1, wherein:
   the sensor pattern is disposed above the third electrode; and
   an insulation layer is disposed between the sensor pattern and the third electrode.

6. The touch display apparatus of claim 1, wherein a part of the pixel areas in the display panel does not include the third electrode under the sensor pattern.

7. The touch display apparatus of claim 1, wherein the sensor pattern includes a photosensitive material.

8. The touch display apparatus of claim 7, wherein the photosensitive material includes a photosensitive material having a changing electrical characteristic when an infrared light is irradiated thereto.

9. The touch display apparatus of claim 7, wherein the photosensitive material includes a photosensitive material having a changing electrical characteristic when a visible light is irradiated thereto.

10. The touch display apparatus of claim 1, wherein the sensor pattern includes amorphous silicon.

11. The touch display apparatus of claim 1, wherein the sensor pattern includes an n+- or p+-doped amorphous silicon.

12. The touch display apparatus of claim 1, wherein the sensor pattern includes two or more layers made of different materials.

13. The touch display apparatus of claim 1, further comprising:
   a light output device configured to output a light to be irradiated to the sensor pattern; and
   a light output control device configured to control light output timing of the light output device.

14. The touch display apparatus of claim 13, wherein, in the light output timing, the switching transistor is in a turn-off state.

15. The touch display apparatus of claim 13, further comprising a light guide member configured to guide a light output from the light output device to an area in which the sensor pattern is located.

16. The touch display apparatus of claim 15, wherein the light guide member:
   is disposed on a layer in which the switching transistor is disposed; and
   is disposed on the entire area or a partial area of the display panel.

17. The touch display apparatus of claim 15, wherein a pixel area in which the sensor pattern exists is located on a partial area or the entire area of the display panel.

18. The touch display apparatus of claim 1, further comprising:
   a display interval for image displaying and a touch sensing interval for touch sensing,
   wherein the display interval includes a timing in which a gate signal of a turn-on level voltage is supplied to the gate line, and
   wherein the touch sensing interval includes a timing in which light is irradiated to the sensor pattern when a gate signal of a turn-off level voltage is supplied to the gate line.

19. The touch display apparatus of claim 1, further comprising a touch sensing circuit configured to detect touch information based on a difference in leakage current flowing to the data line through the sensor pattern for each pixel area.

20. The touch display apparatus of claim 19, wherein the difference in the leakage current is generated according to whether there is a touch.

21. The touch display apparatus of claim 19, wherein the difference in the leakage current is generated according to a ridge and a valley of a fingerprint.

22. A display panel that comprises a data line and a gate line arranged therein and a pixel defined by the data line and the gate line, the display panel including a pixel electrode, a switching transistor, and a sensor pattern arranged therein,
   wherein the pixel electrode is disposed in each pixel;
   wherein the switching transistor is electrically connected between the pixel electrode and the data line;
   wherein the sensor pattern is electrically connected between a first electrode and a second electrode of the switching transistor; and
   wherein the switching transistor includes a semiconductor layer, both ends of which directly electrically contact the first electrode and the second electrode, respectively, and
   wherein the switching transistor completely overlaps the sensor pattern.

23. An all-in-one switch device, comprising:
   a first electrode electrically connected to a pixel electrode;
   a second electrode electrically connected to a data line;
   a third electrode electrically connected to a gate line;

a semiconductor layer including a first end in contact with a first end of the first electrode and a second end in contact with a first end of the second electrode; and a sensor pattern including a first end in direct electrical contact with a second end of the first electrode and a second end in direct electrical contact with a second end of the second electrode, wherein the sensor pattern completely overlaps the semiconductor layer.

* * * * *